United States Patent [19]
Reed et al.

[11] 3,943,288
[45] Mar. 9, 1976

[54] TELEPHONE INCORPORATING BINARY CODED DECIMAL TIME DISPLAY

[75] Inventors: Fredric L. Reed, Beaver Falls, Pa.; Edgar D. Young, Hilliard, Ohio

[73] Assignee: Edgar D. Young, Columbus, Ohio

[22] Filed: Oct. 23, 1973

[21] Appl. No.: 408,632

[52] U.S. Cl. .............. 179/2 TC; 58/19 R; 58/23 A; 58/23 AC; 58/152 T; 179/81 C; 179/90 K; 58/50 R

[51] Int. Cl.² ......................................... G04C 17/02

[58] Field of Search ............ 179/2 TC, 7.1 R, 81 C, 179/84 L, 90 L; 58/152 T, 23 A, 23 AC, 152 B, 19 R, 50 R

[56] References Cited
UNITED STATES PATENTS

| | | | |
|---|---|---|---|
| 2,970,226 | 1/1961 | Skelton et al. | 307/88.5 |
| 3,029,593 | 4/1962 | Gerace | 58/152 T |
| 3,281,541 | 10/1966 | Learner | 179/90 K |
| 3,294,910 | 12/1966 | Jackson | 179/2 TC |
| 3,410,082 | 11/1968 | Taylor et al. | 58/23 R |
| 3,664,116 | 5/1972 | Emerson et al. | 58/23 A |
| 3,744,235 | 7/1973 | Kratomi | 58/50 R |
| 3,750,384 | 8/1973 | Miller et al. | 58/50 R |
| 3,841,082 | 10/1974 | Cuevas et al. | 58/50 R |
| 3,889,459 | 6/1975 | Lu | 58/50 R |
| 3,707,071 | 12/1975 | Walton | 58/50 R |

*Primary Examiner*—William C. Cooper
*Assistant Examiner*—C. T. Bartz
*Attorney, Agent, or Firm*—Biebel, French & Bugg

[57] ABSTRACT

A combined telephone and binary clock is disclosed in which light emitting diodes are formed in the telephone push buttons and are provided with a binary coded decimal display so that telephone push buttons provide an indication of time. The clock may be periodically preset by a signal transmitted over the telephone line. An alarm circuit is included to cause the telephone to ring at a predetermined or preselected time.

9 Claims, 5 Drawing Figures

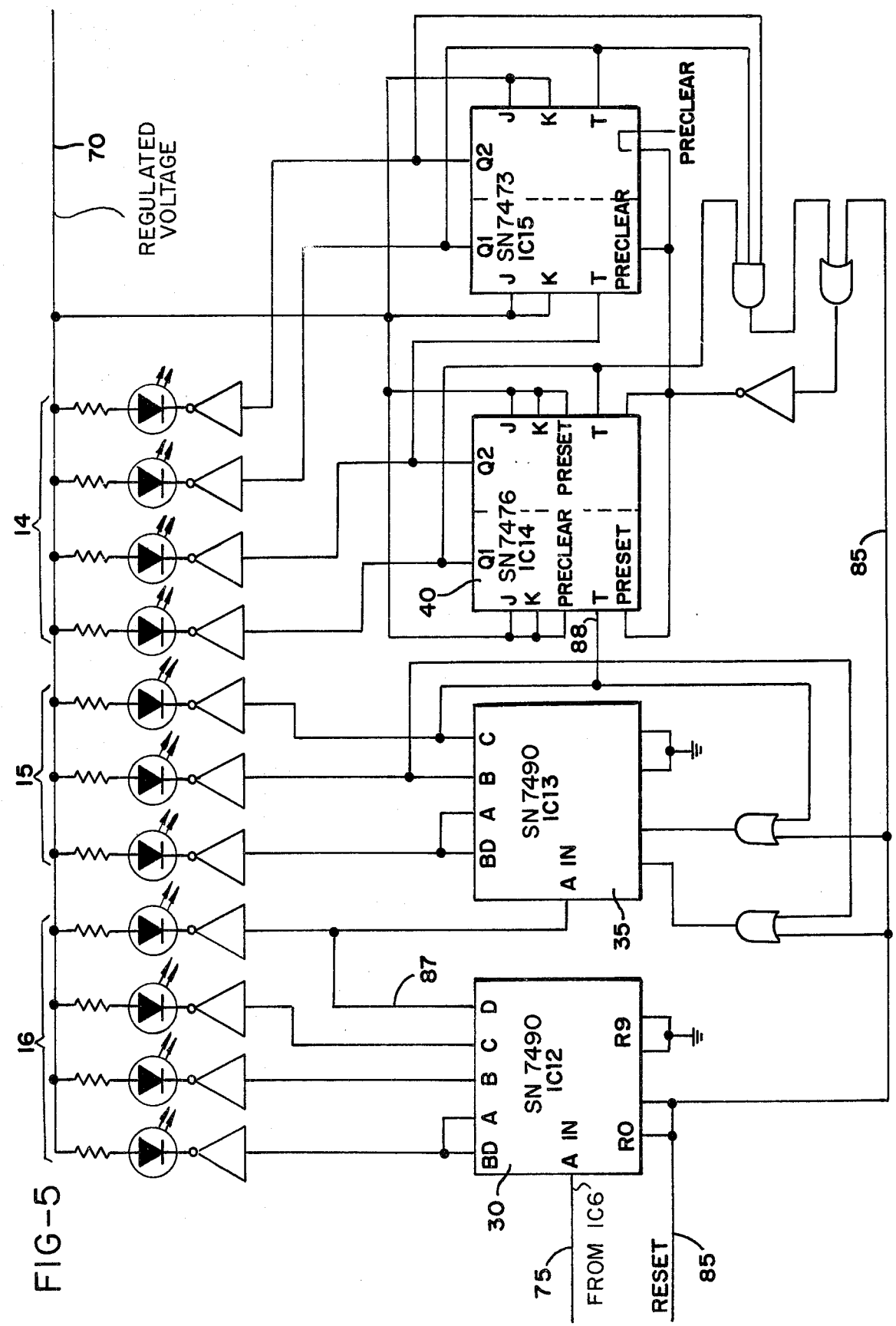

TELEPHONE INCORPORATING BINARY CODED DECIMAL TIME DISPLAY

BACKGROUND OF THE INVENTION

This invention is directed to electronic clocks and more particularly to the combination of an electronic clock and a telephone.

Electronic clocks, and more particularly clocks which employ a binary readout to illuminate a system of lights in accordance with a binary code, are known as shown for example in U.S. Pat. Nos. 3,750,384 and 3,410,082. Clocks or timepieces which employ an output to illuminate lamps in a simple binary code have found limited application, for use in novelty devices, advertising displays and the like. However, the potential use of binary clock or time displays has not been fully realized or appreciated, due in part to the failure of the prior art to find a suitable embodiment for such displays.

SUMMARY OF THE INVENTION

This invention is directed to the combination of a telephone and a digital clock having a binary coded decimal display, and utilizes the fact that the conventional push button telephone as marketed by the Bell System (under the trademark "TOUCH-TONE" of American Telephone and Telegraph Company) is uniquely suitable for the incorporation of a binary coded decimal clock. The clock readout is included as an integral part of the telephone push buttons so that the telephone user has at all times a highly accurate and attractive time display.

This invention takes advantage of the fact that the push button telephone is provided with three columns of four buttons in each column. The first column is used for the binary display of hours, the second column for the binary display of tens of minutes, and the third column for the binary display of minutes. For the purpose of providing a visual display, a light source is incorporated in the buttons, preferably light-emitting diodes (LED) which are characterized by an unusually long service life. In fact, they have a useful life which is substantially greater than that of the telephone itself. The LED's themselves form an integral part of the push buttons but do not in any way interfere with or detract from the normal use of the telephone.

Further, time is displayed in binary coded decimal form (BCD) as distinguished from simple binary form. In this manner, a readout is provided with the tens of minutes (zero to 5) displayed in the center column, and the minutes (zero to 9) displayed in the right-hand column, as distinguished from prior binary time displays which employ a more lengthy, and accordingly more difficult to comprehend, binary code for displaying from zero to 59 minutes in a single column. Again, the push button telephone is uniquely adapted for incorporating a BCD display.

The invention utilizes a conventional sixty cycle AC signal applied to the telephone for the purpose of converting the same through substantially conventional circuits to a BCD time display. In addition, provision has been made for accurate time preset, preferably automatically, on a 12- or 24-hour basis. The preset employs a tone-modulated synchronizer signal which is supplied by the telephone company over the conventional lines, at a precise time, for automatically presetting all the clocks on the line to a desired time. Preferably, the preset makes use of the built in reset capability of the dividers circuits in the clock.

A further feature of the invention permits the user to set in an alarm signal by the operation of auxiliary setting switches or by the operation of the telephone push buttons, which results in the alarm time being stored until it coincides with the time being displayed, at which time the ringing circuit of the telephone is actuated.

The invention has certain important advantages. First, the time readout and display is continuous, so that the user of the telephone does not have to dial a number to obtain the correct time. Secondly, the telephone company does not have to maintain expensive and complicated equipment to make time information available to the user, and there would be a corresponding decrease in load on the system by reason of the absence of time calls and the elimination of the present time tapes.

Another advantage is the provision of an accurate time keeping device which the user can depend on to be accurate in the same manner that the user now depends on the telephone for dependable communications. The synchronizer signal would provide like time readouts for all the devices in use within the same time zone.

A further advantage of the invention is the provision of a uniquely different telephone which incorporates an attention arresting device although it is silent and unobtrusive. The time display enhances the conspicuousness of the telephone and provides an attractive eye-catching device that constantly reminds the user that the telephone is available. The absence of any lights could be used as an indication that the telephone is out of order.

The circuitry employed in providing the BCD display can conveniently be incorporated into the free space within a telephone, as the semi-conductor circuitry involved is adaptable to miniaturization of integration and is virtually maintenance free.

It is accordingly an object of the invention to provide a binary clock particularly adapted for use with a conventional push button type telephone.

Another object of the invention is to provide a binary coded decimal display of time using lamps embedded in the push buttons of a telephone.

Another object of the invention is the provision of a clock having a time display incorporating light emitting diodes in the push buttons for the display of time in binary form.

Another object of the invention is the provision in a combined telephone and binary clock of an automatic setting feature by means of which the time is accurately preset on a regular basis.

A further object of the invention is the provision, in a combination telephone and clock of an automatic alarm using the telephone ringing device as part of the alarm.

Other objects and advantages of the invention will be apparent from the following description, the accompanying drawings, and the appended claims.

BRIEF DESCRIPTION OF THE DRAWINGS

FIG. 5 is an electrical schematic diagram showing the counter means and the light emitting diodes which display time.

DESCRIPTION OF THE PREFERRED EMBODIMENT

Figure 1:
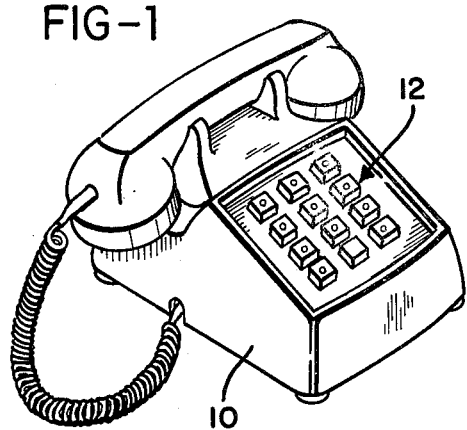
FIG. 1 is a perspective view of a telephone to which this invention has been applied.

Reference is now made to the drawings which illustrate a preferred embodiment of the invention, and particularly to FIG. 1 wherein a conventional push button telephone 10 is shown. The telephone includes a conventional push button assembly, shown generally at 12 having twelve buttons arranged in three vertical columns 14, 15 and 16, each including four individual push buttons.

The push button assembly 12 is of conventional design and is used in the dialing of a telephone number. Typically, each push button will generate a two-tone audio signal which will be decoded by appropriate telephone equipment to represent a single number in the dialing of a telephone number.

In the present invention, each push button includes, as an integral part thereof, a controllable light means 20, preferably a light emitting diode (LED). Alternatively, the light means may be positioned adjacent each push button, or the bushing 21 surrounding each button may be formed from a clear plastic material such as Lucite, and illuminated by remotely located lamps through fiber optic bundles.

Figure 2:
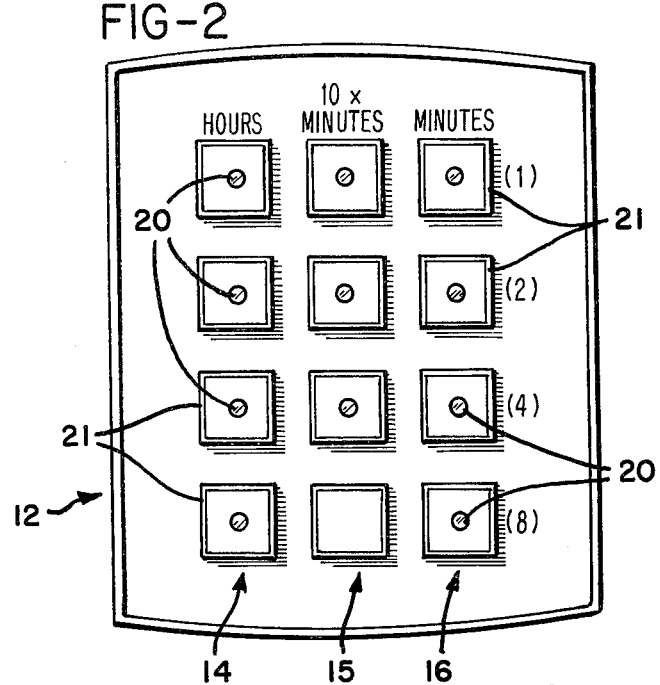
FIG. 2 is a plan view of the telephone push buttons incorporating the controllable light means for displaying time in binary form.

FIG. 2 is an enlarged view of the telephone push buttons showing the light emitting diodes 20 located centrally in each push button and exposed for viewing. As is seen in FIG. 2, the left vertical column of the push buttons will be used to display hours as a binary number with the upper push button representing "1", the next lower push button representing number "2", the third push button representing the number "4", and the lowermost push button representing "8".

The center of the vertical column is used to display in binary form tens of minutes from zero to five, and accordingly only the upper three push buttons are used leaving the lowermost, or "operator" button free of a light source. The unit minutes from zero to nine are displayed in the right column 16 in a similar manner.

Figure 3:
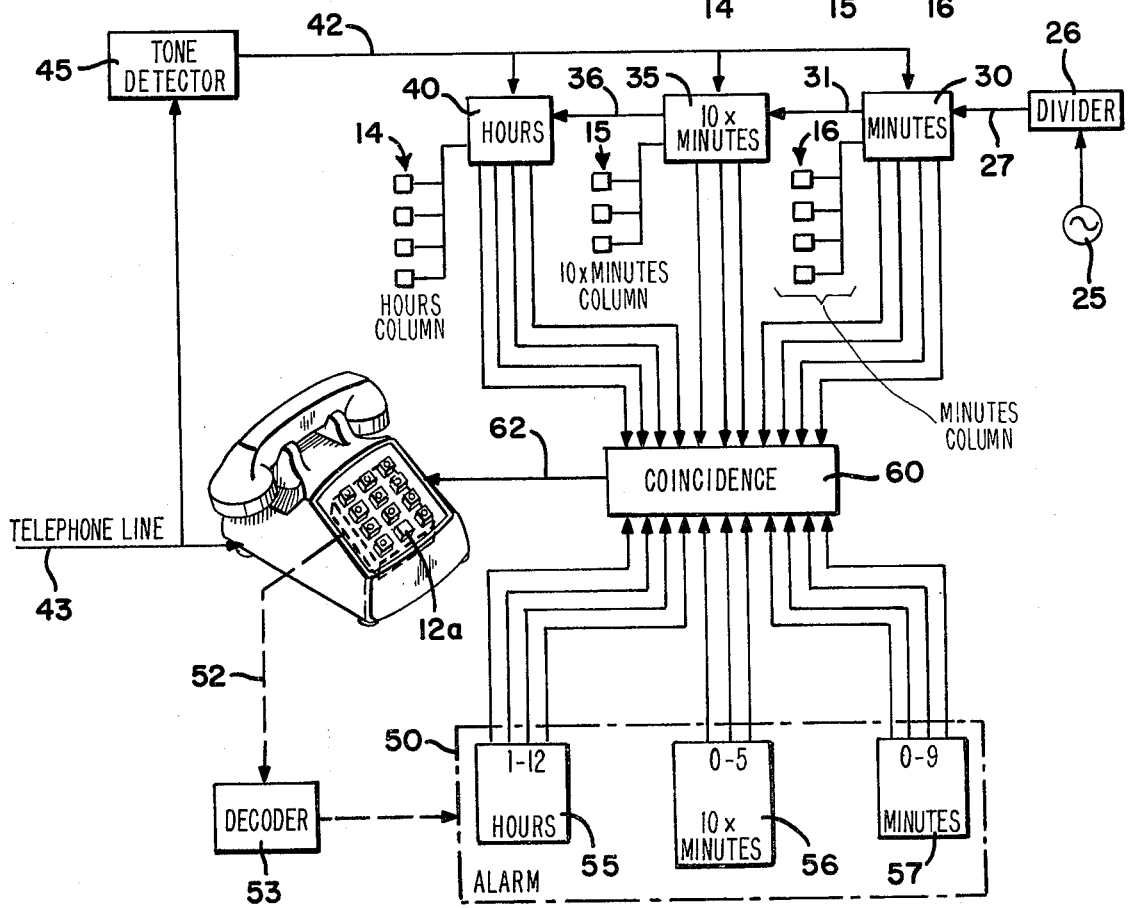
FIG. 3 is a block diagram of the invention.

Reference is now made to FIG. 3 which is a block diagram showing the general operation of the invention. Power from a conventional alternating current source 25, such as is available in the United States from the 60 Hz power source, is applied to a divider 26 which provides an output on line 27 of one pulse per minute. This output pulse is applied directly to a resettable minutes counter 30, the outputs of which control the light emitting diodes in the right hand column 16 of the telephone push buttons. The minutes counter 30 includes means for resetting itself to zero on the next pulse from the divider 26 after the binary number representing nine is displayed so that a pulse will be applied on line 31 to the tens of minutes counter 35. Therefore, once the number nine has been displayed in the right hand column, the next minute pulse on line 27 will reset the minute counter 30 to zero and cause a single pulse to be applied to the tens of minutes counter 35 so that the number "1" is displayed in column 15 representing "10" minutes. The tens of minutes counter 35 is provided with means to reset it on the next pulse from the minutes counter 30 after the number "5" has been displayed in column 15. Accordingly, an output pulse is applied on line 36 to the hours counter 40 to cause the hours display to change.

Thus, alternate current power supply 25 provides a frequency stable source of pulses which may be used to provide display in binary decimal form, of time. It is to be understood that the frequency source 25 could be some other stable source of pulses such as a crystal controlled oscillator, although for the purposes of this invention, a conventional alternating current power source is preferred.

Each of the counters 30, 35 and 40 may be set to a predetermined number upon the application of a reset signal on line 42. This reset signal, for example, would set the hours counter to one, the tens of minutes counter 35 and the minutes counter 30 each to "zero", corresponding to a time of 1:00. This would allow the clocks in each telephone to be synchronized and will insure their accuracy, in spite of momentary power failures. It also has the advantage of being able to change the clock setting semi-annually when converting from standard time to daylight savings time and vice versa. A reset signal may be generated by an audio tone provided by telephone company on the telephone line 43 to a tone detector 45. Upon receipt of the proper tone, a reset signal would be generated and applied to the counters within the clock.

This invention also includes an alarm circuit which allows the bell within the telephone to be utilized. While the telephone handset is in the cradle, depressing the push button 12a will enable the alarm circuit, and thereafter pressing the appropriate push buttons in columns 14, 15 and 16 will preset the alarm circuit 50 to the desired time. As shown in FIG. 3, the push buttons 12 are connected by means of line 52 to the tone decoder circuit 53 which connect to storage circuits 55, 56 and 57 representing hours, tens of minutes and minutes.

A coincidence circuit 60 is responsive to the condition of counters 30, 35 and 40 and also to the preset inputs from the alarm circuit 50. This coincidence counter therefore compares the preset time in the alarm circuit 50 to the actual time in the counters, and when these times coincide, an output is provided on line 62 to cause the telephone to ring. Picking up the telephone handset will disable the alarm circuit.

Figure 4:
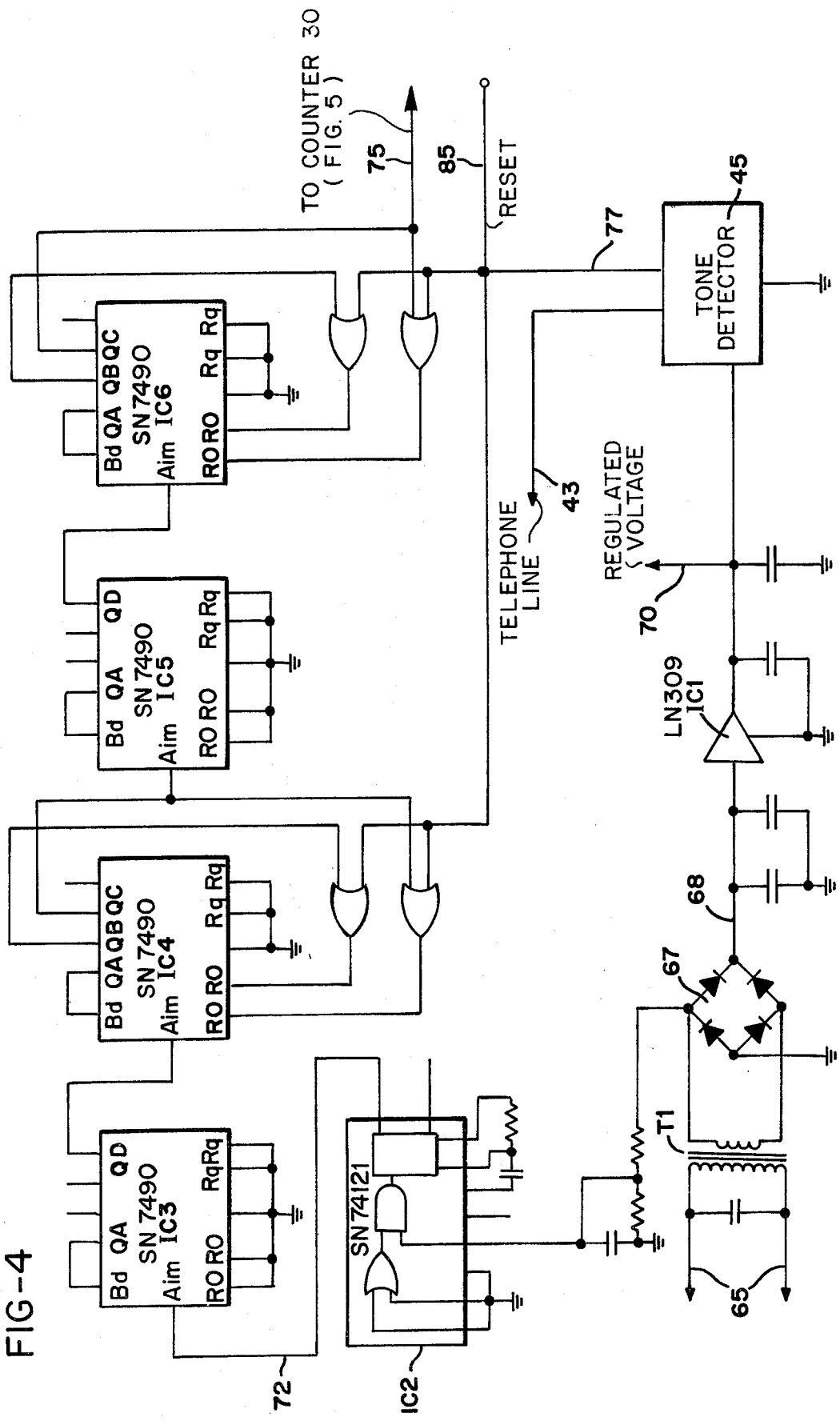
FIG. 4 is an electrical schematic diagram of the power supply pulse generator means and tone decoder.

Reference is now made to FIG. 4 which shows the clock power supply, pulse generator and tone decoder. The frequency stable source of pulses is obtained from a conventional 110 volt, 60 Hz power line 65, through a transformer T1 and full wave rectifier 67. The direct current output of the full wave rectifier on line 68 is connected through a voltage regulator circuit including IC1. The regulated output is applied on line 70 to all of the integrated circuits and light emitting diodes used as part of the clock circuitry and to the tone decoder circuit 45.

The alternating current is also applied to a monostable multivibrator IC2, the output of which, on line 72 is applied to a decade counter including four integrated circuits IC3, IC4, IC5 and IC6. The output of IC6 on line 75 is a one pulse per minute signal which will be applied to the counter circuits of FIG. 5.

The tone detector 45, shown in FIG. 4, is connected to the telephone line 43, and has an output on line 77 which is connected to a reset line 85 to preset the clock to a predetermined time whenever the appropriate tone is detected.

Reference is now made to FIG. 5 which is an electrical schematic diagram of the clock circuitry and light emitting diode time display. The one pulse per minute input from the frequency stable pulse generator of FIG. 4 is applied on line 75 as an input to the minutes counter 30. Counter 30 is an integrated circuit of conventional design which is a binary coded decimal counter. The outputs from the counter 30 are applied to the four light emitting diodes in the right hand column 16 of the telephone push buttons. Since the integrated circuit includes means to reset following the display of the numeral "9", an output on line 87, when the counter has reset is applied to the tens of minutes counter 35. This counter has three outputs connected to selectively energize the three light emitting diodes in column 15 representing tens of minutes.

The output of the tens of minutes counter 35 on line 88 is applied to the hours counter 40 which includes IC14 and IC15. The outputs form the ICs 14 and 15 are applied to the four light emitting diodes which are found in the hours column 14 of the telephone push buttons.

The reset signal on line 85 will preset the hours counter to display the numeral "1" and will reset the minutes counter 30, the tens of minutes counter 35, and the counters in the pulse generator so that the entire clock can be set accurately to within 1/10 of a second by the reset pulses.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. In combination with a telephone in which a plurality of push buttons are arranged on the telephone in three vertical columns of four buttons in each column, said buttons being connected for conventional telephone dialing,
   the improvement comprising a clock including
   controllable light means associated with each button in the left and right vertical columns and with at least three of the four buttons in the center column,
   means for providing a frequency stable source of pulses,
   counter means connected to the output of said pulse source means to provide binary output signals representing minutes, tens of minutes and hours, and
   means connecting said counter means to said controllable light means for display of time in binary form with the hours displayed as a binary number in the left column, the tens of minutes displayed as a binary number in the center column, and the minutes displayed as a binary number in the right column.

2. The combination of claim 1 wherein said controllable light means includes individual light emitting diodes formed as integral parts of said buttons.

3. The telephone-clock combination of claim 1 wherein said pulse generator means provides an output pulse each minute, wherein said light means includes light emitting diodes, and wherein said counter means includes
   a minutes counter connected to the output of said pulse generator means and having outputs connected to individual light emitting diodes to display unit minutes as a binary number, and means for resetting said minutes counter to zero on the next pulse from said pulse generator means after the binary number representing nine has been displayed,
   a tens of minutes counter responsive to an output of said minutes counter and having outputs to individual light emitting diodes to display tens of minutes as a binary number, and means for resetting the tens of minutes counter to zero on the next pulse from said minutes counter after the binary number representing five has been displayed,
   and an hours counter responsive to the output of said tens of minutes counter and having outputs connected to individual light emitting diodes to display hours as a binary number, and means for resetting the hours counter to one on the next pulse after the binary number respresenting twelve has been displayed.

4. In combination with a telephone in which a plurality of push buttons are arranged on the telephone in three vertical columns of four buttons in each column, said buttons being connected for conventional telephone dialing,
   the improvement comprising a clock including:
   controllable light means associated with each button in the left and right vertical columns and with at least three of the four buttons in the center column;
   means for providing a frequency stable source of pulses;
   counter means connected to the output of said pulse source means to provide binary output signals representing minutes, tens of minutes and hours;
   means connecting said counter means to said controllable light means for display of time in binary form with the hours displayed as a binary number in the left column, the tens of minutes displayed as a binary number in the center column, and the minutes displayed as a binary number in the right column; and
   means for presetting said counter means to a predetermined time including means for detecting a resetting pulse transmitted on a telephone line connected to said telephone, and means for presetting a binary number into said counter means upon receipt of said pulse.

5. The telephone-clock combination of claim 1 further including an alarm circuit comprising
   means for presetting a predetermined time,
   comparison means responsive to said presetting means and to said counter means for providing an output when said times coincide, and
   means responsive to the output of said comparison means for operating an alarm.

6. In combination with a telephone in which a plurality of push buttons are arranged on the telephone in three vertical columns of four buttons in each column, said buttons being connected for conventional telephone dialing,
   the improvement comprising a clock including:
   controllable light means associated with each button in the left and right vertical columns and with at least three of the four buttons in the center column;
   means for providing a frequency stable source of pulses;
   counter means connected to the output of said pulse source means to provide binary output signals representing minutes, tens of minutes and hours;

means connecting said counter means to said controllable light means for display of time in binary form with the hours displayed as a binary number in the left column, the tens of minutes displayed as a binary number in the center column, and the minutes displayed as a binary number in the right column; and an alarm circuit comprising:

means for presetting a predetermined time including the telephone push buttons, means for decoding the output of the telephone push buttons, and means responsive to the decoding means for storing a time signal generated by the operation of said push buttons;

comparison means responsive to said presetting means to said counter means for providing an output when said times coincide; and means responsive to the output of said comparison means for operating an alarm.

7. An electronic clock for displaying time in binary coded decimal form including time display means including three vertical columns arranged in side by side relation, the left column including four controllable light means for displaying hours in binary form, a center column including three controllable light means for displaying tens of minutes in binary form, the right vertical column including four controllable light means for displaying minutes in binary form, means for providing a frequency stable source of pulses, a minutes counter responsive to said frequency stable source means and having outputs connected to individual light means in the right vertical column, and means for resetting said minutes counter to zero upon the occurrence of the next pulse from the frequency stable source means after the binary number representing nine has been displayed, a tens of minutes counter responsive to said minutes counter and having outputs connected into individual light means in the center column, and means for resetting said tens of minutes counter to zero. upon the occurrence of the next pulse from said minutes counter after the binary number representing five has been displayed and, an hours counter responsive to said tens of minutes counter and having outputs connected into individual light means in the left column, and means for resetting said hours counter to one upon the occurrence of the next pulse from said tens of minutes counter after the binary number representing twelve has been displayed.

8. A binary numerical display, comprising a telephone with push-buttons in the three standard vertical rows for selecting telephone numbers, individual light sources associated with said pushbuttons, clock means connected to said push-buttons and providing binary output signals representing time with the first vertical row of said push-buttons representing hours, and the second and third rows representing minutes.

9. A telephone comprising a keyboard including push buttons arranged in three columns of four buttons each, light emitting diodes incorporated in the buttons on the first and third columns and in at least three of the buttons of the middle column, clock means, and means responsive to said clock means for selectively illuminating said diodes to provide a binary indication of time.

* * * * *